Oct. 18, 1955    L. L. JENKINSON    2,720,860
TRAINING PLATFORM FOR BIRDS
Filed May 11, 1954
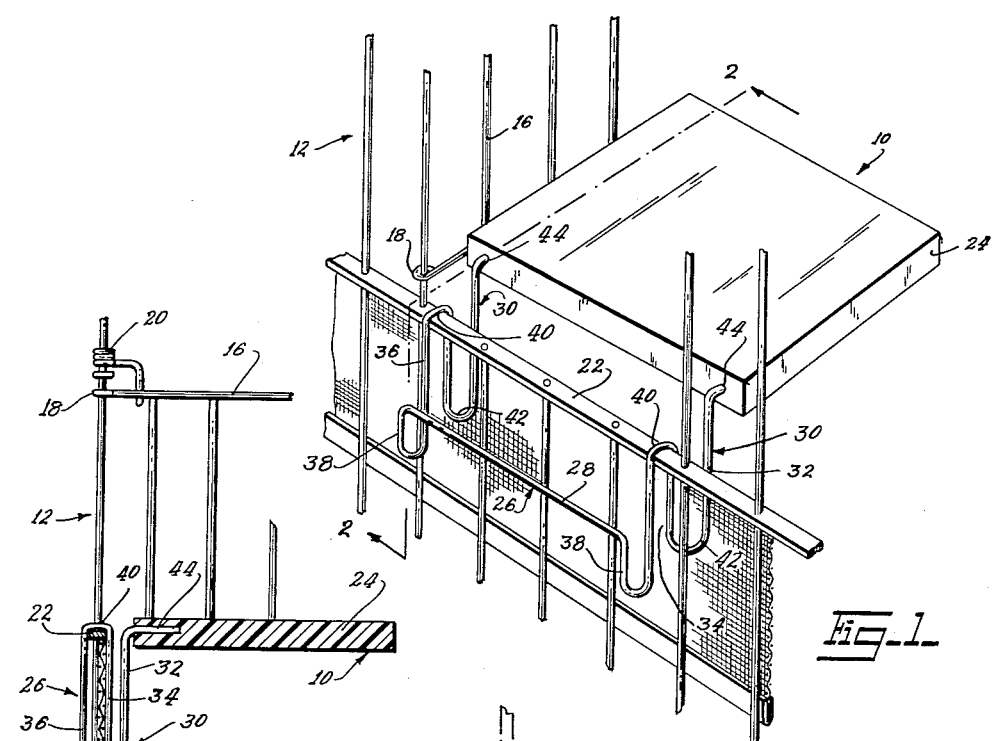
Fig-1.
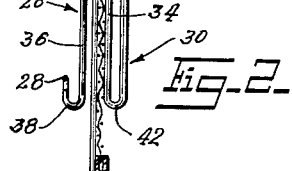
Fig-2.
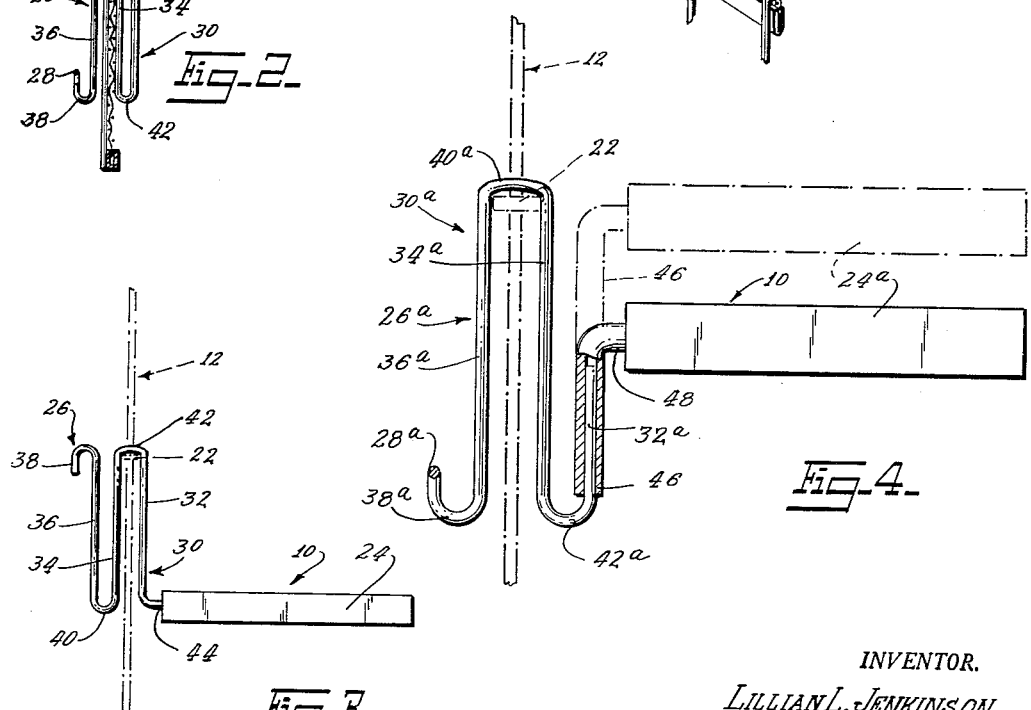
Fig-3.
Fig-4.
INVENTOR.
LILLIAN L. JENKINSON
BY
ATTORNEY

# United States Patent Office 2,720,860
Patented Oct. 18, 1955

2,720,860

TRAINING PLATFORM FOR BIRDS

Lillian L. Jenkinson, Bronx, N. Y.

Application May 11, 1954, Serial No. 428,869

4 Claims. (Cl. 119—26)

This invention relates to bird cage accessories. More particularly, the invention has reference to a novelly designed platform adapted to be removably clipped at a selected location to a canary bird or parakeet cage, to afford a support for the bird, and which can be used to advantage in facilitating the bird's entry into or departure from the cage.

It is a common practice among bird owners, particularly the owners of parakeets, to permit the bird to enter or leave the cage at will, so as to be free to fly about the house. It is difficult, in this connection, for the bird to leave the cage when the cage is equipped, as is often the case, with a sliding or hinged door which is adapted to automatically shift to closed position, either by gravitation or by spring action.

One important object of the present invention, accordingly, is to provide a platform of the type stated which can be detachably clipped to a cage at such a location as to be supported upon the sill or lower edge of the door opening, with the platform being so designed and positioned as to hold a hinged door in open position.

Another object of importance is to provide a platform as stated which will be particularly adapted, when mounted at the location specified, to facilitate the bird's landing at the door opening, when the bird is returning to the cage after flying about a room.

Another object of importance is to provide a platform of the nature referred to which can be manufactured of any readily obtainable materials, such as molded plastic, wood, or the like, the platform being particularly designed to facilitate its construction at a minimum of cost, from inexpensive materials. In this connection, it is proposed that the design be such as to impart a long life to the device without danger of breakage, despite its relatively low cost.

Yet another object is to provide a platform as stated which can be reversed side for side in position, in a manner which will cause the platform to be disposed at different horizontal planes relative to the door opening, as desired.

Another object of importance is to provide, in one form of the device, a telescopically adjustable frame assembly which will facilitate the location of the platform member in selected, horizontal planes.

For further comprehension of the invention, and of the objects and advantages thereof, reference will be had to the following description and accompanying drawings, and to the appended claims in which the various novel features of the invention are more particularly set forth.

In the accompanying drawings forming a material part of this diclosure:

Fig. 1 is a perspective view of a platform formed in accordance with the present invention, as it appears when mounted upon a bird cage, the cage being illustrated fragmentarily and in perspective.

Fig. 2 is a sectional view taken substantially on line 2—2 of Fig. 1.

Fig. 3 is a side elevational view of the platform, the cage being illustrated in dotted outline, the platform being inverted to locate the perch element in a horizontal plane or at a level lower than the lower edge or sill of the door opening.

Fig. 4 is an enlarged view partly in elevation and partly in section of a modified form of the invention, an associated bird cage being illustrated fragmentarily, the dotted lines showing an adjusted position of the perch element.

The reference numeral 10 has been applied generally in the drawings to the first form of the invention, shown in Figs. 1–3, the device being illustrated as it appears when supported upon a conventional bird cage 12 having a door opening 14 normally closed by a swinging door 16 hinged at 18 to one side of the door opening, and normally actuated to a closed position by a spring 20. The lower edge of the door opening is defined by a sill 22, and under ordinary conditions, the device is hooked over or clipped to said sill as shown in the several figures of the drawings. The parts so far described are entirely conventional and do not constitute part of the present invention. The invention includes a perch element 24 which in the illustrated example, but not necessarily, is formed of molded plastic, said perch element being of rectangular shape in the illustrated embodiment of the invention. The perch element 24 is carried by a supporting frame 26 formed from a single length of wire material bent to the shape illustrated in the drawings.

The supporting frame 26, intermediate its ends, is shaped with a straight, horizontally extending bight 28, from the opposite ends of which legs 30 extend, the legs being embedded at their outer ends in the inner edge of the perch element 24.

Each leg 30 is identical to the other, so the description of one will suffice for both. Each leg includes straight outer, intermediate, and inner leg portions 32, 34 and 36, respectively, said portions being coextensive in length in the first form of the invention, and being extended in closely spaced, parallel relation.

That end of the inner leg 36 nearer bight 28 is formed with a reversely bent extension 38 integrally connecting the bight to the respective inner leg portions 36. At its other end, each inner leg portion 36 is integrally connected by a bight 40 to one end of intermediate leg portion 34, intermediate leg portion 34 being integrally connected at its other end to one end of outer leg portion 32, by a bight portion 42. The bight portion 40 may be appropriately termed an inner bight portion and the bight portion 42 may be considered an outer bight portion.

On the other or outer end of leg portion 32, there is integrally formed a forwardly or outwardly projected extension 44 embedded in the inner edge portion of perch element 24.

Of course, the supporting frame can be fixedly secured to the perch element in any other suitable manner, as by screws or equivalent fastening elements.

By reason of the arrangement illustrated, it will be seen that the supporting frame has, at opposite sides thereof, oppositely opening, elongated slots, one slot being defined between inner leg portion 36 and intermediate leg portion 34, and the other, oppositely opening slot at each side of the frame being defined between intermediate leg portion 34 and outer leg portion 32.

The slots can be selectively employed to receive the sill 22, and in Figs. 1 and 2, the slot defined between leg portions 34, 36 is utilized. In this arrangement, the perch element 24 is disposed in a horizontal plane common to that within which the sill 22 extends.

When the perch element is so disposed, the door 16 is held open by one side of the perch element, as shown in Fig. 1, to facilitate the bird's entry or departure.

The device might also be used wholly interiorly of a cage as a supplemental perch, and can be hooked over the sill 22 with the perch element disposed inside the cage rather than outside. In this arrangement the parts appear as in Fig. 3, the slots defined between leg portions 32, 34 being utilized to receive the sill 22. As a result, the device is completely inverted from the position shown in Figs. 1 and 2, to dispose the perch element 24 in a horizontal plane lower than that of the sill 22. Of course, the device can be disposed with the perch element located interiorly of the cage, while said element is in coplanar relation to said sill 22, if desired.

In Fig. 4 there is illustrated a modified form wherein the perch element is adjustably mounted upon the supporting frame. In this form the device has been designated generally at 10ª, and includes a supporting frame 26ª having a bight 28ª, said bight being integral at its opposite ends with legs 30ª, each leg including parallel, closely spaced and straight outer, intermediate, and inner leg portions 32ª, 34ª and 36ª respectively, the leg portions 36ª having reversely bent extensions 38ª integral with the ends of the bight 28ª. An inner bight portion 40ª connects the leg portions 34ª, 36ª, and an outer bight portion 42ª connects the leg portions 34ª, 32ª.

In this form of the invention, the leg portion 32ª is only about half the length of the other leg portions, and is slidably engaged in a tubular member 46, open at one end to receive the leg portion 32ª, and formed at its other end with a lateral extension 48 embedded in the inner edge part of perch element 24ª.

By reason of this arrangement, and as shown in full and dotted lines in Fig. 4, the perch element can be adjusted upwardly or downwardly relative to the sill 22, without changing the position of the supporting frame 26ª. The telescoping outer leg portion permits the desired adjustment of the perch element to be made, and in each position of adjustment, the tubular member 46 is frictionally engaged with the associated outer leg portion 32ª to preserve the adjustment.

The device can be used to particular advantage as a training platform. As noted above, it can be made of any material, although plastic is preferred for the perch element at present. It is characterized by the simplicity of its clip means, whereby it can be attached to or detached from a conventional cage with ease and speed. Further, there is a means incorporated directly in the formation of the supporting frame, which permits adjustable mounting and positioning of the perch element.

The device, as shown in Fig. 1, can be used as a take-off platform for birds having the freedom of the house. Further, the device assists the bird owner in training the bird to respond to his or her instructions.

Still further, the device as constructed can be merchandised in a preassembled condition, thereby facilitating its being placed in use without the necessity of carrying out any assembly operations.

It is to be understood that this training platform may be made of plastic, metal, wood and alloys such as aluminum, or of any other suitable material.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A platform for a bird cage having a door opening provided with a sill, comprising a perch element, and a supporting frame connected to said perch element and adapted to be clipped to said sill, said supporting frame being formed with a bight and with legs extending from opposite ends of the bight to said perch element, said legs being fixedly connected to the perch element, each leg being reversely bent upon itself a plurality of times to define a plurality of opositely opening slots any of which may receive said sill for inversion of the perch element in its sill-supported position, each leg including an outer leg portion, an intermediate leg portion, and an inner leg portion, the inner leg portion being connected to said bight and the outer leg portion being connected to said perch element.

2. A platform for a bird cage having a door opening provided with a sill, comprising a perch element, and a supporting frame connected to said perch element and adapted to be clipped to said sill, said supporting frame being formed with a bight and with legs extending from opposite ends of the bight to said perch element, said legs being fixedly connected to the perch element, each leg being reversely bent upon itself a plurality of times to define a plurality of oppositely opening slots any of which may receive said sill for inversion of the perch element in its sill-supported position, each leg including an outer leg portion, an intermediate leg portion, and an inner leg portion, the inner leg portion being connected to said bight and the outer leg portion being connected to said perch element, the intermediate and inner leg portions having an inner bight portion connecting the same at one end, the outer and intermediate leg portions having an outer bight portion connecting the same, said outer and inner bight portions being disposed at opposite ends of the intermediate leg portion.

3. A platform for a bird cage having a door opening provided with a sill, comprising a perch element, and a supporting frame connected to said perch element and adapted to be clipped to said sill, said supporting frame being formed with a bight and with legs extending from opposite ends of the bight to said perch element, said legs being fixedly connected to the perch element, each leg being reversely bent upon itself a plurality of times to define a plurality of oppositely opening slots any of which may receive said sill for inversion of the perch element in its sill-supported position, each leg including an outer leg portion, an intermediate leg portion, and an inner leg portion, the inner leg portion being connected to said bight and the outer leg portion being connected to said perch element, the intermediate and inner leg portions having an inner bight portion connecting the same at one end, the outer and intermediate leg portions having an outer bight portion connecting the same, said outer and inner bight portions being disposed at opposite ends of the intermediate leg portion, said outer leg portion being adjustable as to length.

4. A platform for a bird cage having a door opening provided with a sill, comprising a perch element, and a supporting frame connected to said perch element and adapted to be clipped to said sill, said supporting frame being formed with a bight and with legs extending from opposite ends of the bight to said perch element, said legs being fixedly connected to the perch element, each leg being reversely bent upon itself a plurality of times to define a plurality of oppositely opening slots any of which may receive said sill for inversion of the perch element in its sill-supported position, each leg including an outer leg portion, an intermediate leg portion, and an inner leg portion, the inner leg portion being connected to said bight and the outer leg portion being connected to said perch element, the intermediate and inner leg portions having an inner bight portion connecting the same at one end, the outer and intermediate leg portions having an outer bight portion connecting the same, said outer and inner bight portions being disposed at opposite ends of the intermediate leg portion, said outer leg portion being adjustable as to length, and including a female part connected to the perch element and a male part rigid with the outer bight portion, said male part being slidably engaged in the female part to telescope adjustably thereinto.

References Cited in the file of this patent

UNITED STATES PATENTS

| | | |
|---|---|---|
| 642,094 | Downing | Jan. 30, 1900 |
| 1,956,652 | Oliver | May 1, 1934 |
| 2,624,310 | Smithson | Jan. 6, 1953 |